United States Patent
Kjeldaas (10) Patent No.: US 8,630,208 B1
(45) Date of Patent: Jan. 14, 2014

(54) MUTING OF COMMUNICATION SESSION PARTICIPANTS

(71) Applicant: Alexander Kjeldaas, Saltsjo Boo (SE)

(72) Inventor: Alexander Kjeldaas, Saltsjo Boo (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/670,203

(22) Filed: Nov. 6, 2012

Related U.S. Application Data (60) Provisional application No. 61/675,195, filed on Jul. 24, 2012.

(51) Int. Cl.
*H04L 12/16* (2006.01)
*H04L 12/28* (2006.01)

(52) U.S. Cl.
USPC ........................................... 370/260; 370/401

(58) Field of Classification Search
USPC .......................... 370/259–262, 278, 282, 401
See application file for complete search history.

(56) References Cited

U.S. PATENT DOCUMENTS

| | | | |
|---|---|---|---|
| 6,597,667 B1 * | 7/2003 | Cerna | 370/260 |
| 7,088,398 B1 * | 8/2006 | Wolf et al. | 348/423.1 |
| 8,233,409 B2 * | 7/2012 | Jayapalan et al. | 370/260 |
| 2003/0179745 A1 * | 9/2003 | Tsutsumi et al. | 370/352 |
| 2010/0259593 A1 * | 10/2010 | Beers et al. | 348/14.09 |
| 2010/0322387 A1 * | 12/2010 | Cutler | 379/32.01 |

\* cited by examiner

*Primary Examiner* — Hong Cho
(74) *Attorney, Agent, or Firm* — Shumaker & Sieffert, P.A.

(57) ABSTRACT

In general, this disclosure describes techniques for performing two-way muting of participant communication devices in a real-time communication session. An example method includes establishing, by a host device, a real-time communication session between a plurality of communication devices, detecting a muting condition between a first communication device and a second communication device of the plurality, and responsive to detecting the muting condition, muting one or more first audio signals that are output by the first communication device where the host device refrains from sending the one or more first audio signals to the second communication device. The method also includes, responsive to detecting the muting condition, muting one or more second audio signals that are output by the second communication device where the host device refrains from sending the one or more second audio signals to the first communication device.

19 Claims, 5 Drawing Sheets

MUTING OF COMMUNICATION SESSION PARTICIPANTS

This application claims the benefit of U.S. Provisional Application No. 61/675,195, filed Jul. 24, 2012, which is assigned to the assignee hereof and hereby expressly incorporated by reference herein.

BACKGROUND

Multiple participants may use a variety of different communication devices that engage in real-time communication sessions. A real-time communication session may relay audio, video, textual, and other types of data between the devices associated with these participants. Each participant may access audio data in a variety of ways, such as by using a telephone receiver, headphones, or loudspeakers. Two or more participants may be physically proximate, including within audible range of one another.

SUMMARY

Techniques of this disclosure provide a method that includes establishing, by a host device, a real-time communication session between a plurality of communication devices, and detecting a muting condition between a first communication device and a second communication device of the plurality. The method also includes using, by the host device, the muting condition to determine that 1) the first communication device will not receive audio data associated with the second communication device while in the real-time communication session, and 2) the second communication device will not receive audio data associated with the first communication device during the real-time communication session. The method also includes, responsive to detecting the muting condition, muting one or more first audio signals output by the first communication device where the host device refrains from sending the one or more first audio signals to the second communication device. The method further includes, responsive to detecting the muting condition, muting one or more second audio signals output by the second communication device where the host device refrains from sending the one or more second audio signals to the first communication device.

Another example of this disclosure provides a computer-readable storage medium comprising instructions for causing a programmable processor of a host device to perform operations. The operations include establishing, by a host device, a real-time communication session between a plurality of communication devices, and detecting a muting condition between a first communication device and a second communication device of the plurality. The operations also include using, by the host device, the muting condition to determine that 1) the first communication device will not receive audio data associated with the second communication device while in the real-time communication session, and 2) the second communication device will not receive audio data associated with the first communication device during the real-time communication session. The operations further include, responsive to detecting the muting condition, muting one or more first audio signals output by the first communication device where the host device refrains from sending the one or more first audio signals to the second communication device. The operations may further include, responsive to detecting the muting condition, muting one or more second audio signals output by the second communication device where the host device refrains from sending the one or more second audio signals to the first communication device.

Yet another example provides a host device that includes at least one processor and a network interface. The at least one processor is configured to establish a real-time communication session between a plurality of communication devices, and detect a muting condition between a first communication device and a second communication device of the plurality of communication devices. Responsive to detecting the muting condition, the at least one processor is operable to mute one or more first audio signals output by the first communication device where the host device refrains from sending the one or more first audio signals to the second communication device, and to mute one or more second audio signals output by the second communication device where the host device refrains from sending the one or more second audio signals to the first communication device.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present disclosure. Like reference characters denote like elements throughout the figures and text.

DETAILED DESCRIPTION

In general, the present disclosure is directed to techniques for two-way muting of output audio provided by participant communication devices in a real-time communication session. A two-way muting occurs when audio signals from two communication devices are reciprocally blocked for both of the communication devices. For example, when a first participant device mutes a second participant device, a two-way mute may occur when the second participant device also mute the first participant device.

Two participants using associated participant communication devices may want to be two-way muted because they may be physically located within audible range of each other. For example, the first participant, using a first communication device, and the second participant, using a second communication device, may be engaged in the same real-time communication session in a single room. If, for example, the second communication device has not muted the first communication device, when the first participant using the first communication device speaks, the first participant may hear the first participant's voice though one or more speakers of the second communication device. This feedback may be disorienting or confusing for the first participant. Furthermore, when the second participant speaks, the first participant may hear the second participant speaking twice: directly and through the speakers of the second communication device. Thus, the first participant may want the audio output provided by the second communication device muted on the first communication device, and may want the audio output provided by the first communication device muted on the second communication device. Similarly, the second participant may wish to have the audio output provided by the first communication device muted on the second communication device, and to have the audio output provided by the second communication device muted on the first communication device.

Techniques of the disclosure include methods for determining when audio output provided by two participant communication devices should be two-way muted, and for performing this two-way muting. These techniques include, for example, two-way muting participant communication devices when one communication device mutes another, detecting locations of two communication devices and two-way muting these communication devices when they are in approximately the same location, outputting test signals from speakers of the communication devices and determining whether microphones of other communication devices receive the test signals. Machine learning may also be used to improve two-way muting in later real-time communication sessions.

Figure 1:
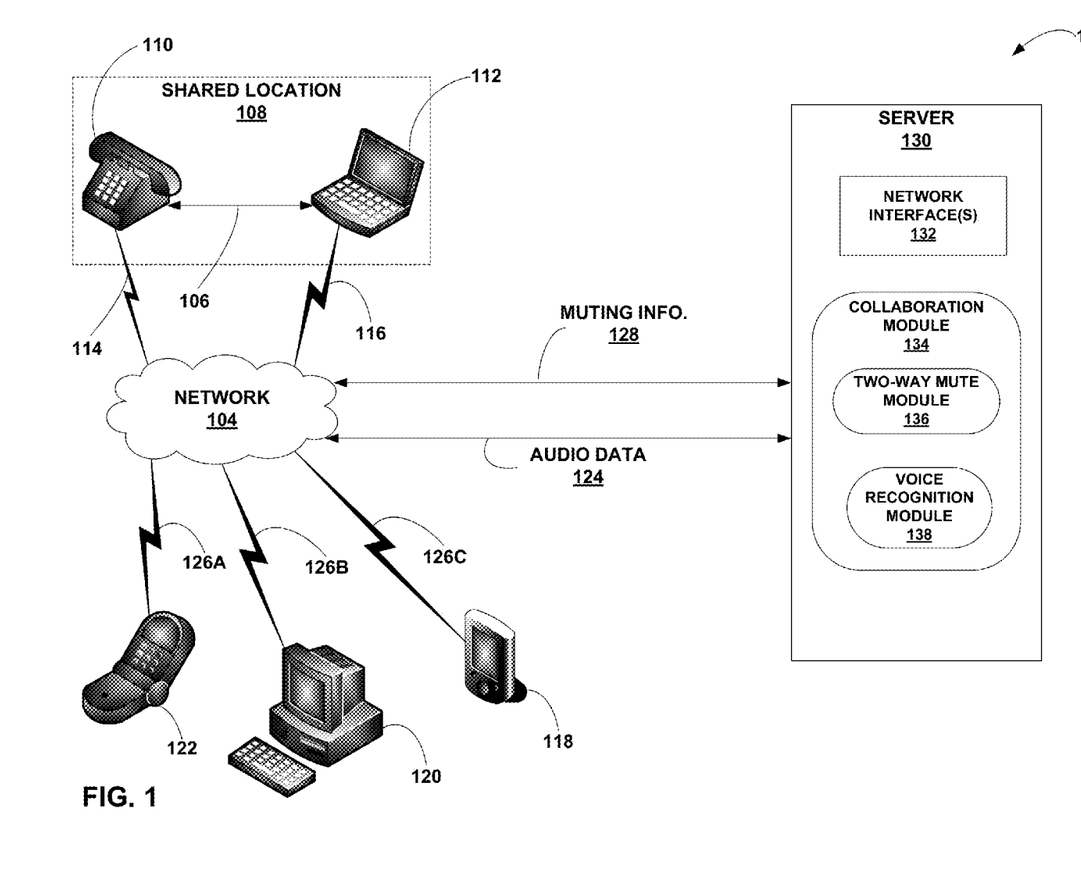
FIG. 1 is a conceptual diagram illustrating an example of a server that may host a multi-participant real-time communication session, and perform two-way muting of audio output provided by participant communication devices, in accordance with one or more aspects of the present disclosure.

FIG. 1 is a conceptual diagram illustrating an example of a server 130 that may host a multi-participant real-time communication session and perform two-way muting of participant communication devices, in accordance with one or more aspects of the present disclosure. FIG. 1 illustrates server 130, which hosts a multi-participant real-time communication session between communication devices 110, 112, 118, 120, and 122.

A real-time communication session may be an audio conference, a video conference, a virtual real-time communication session, or any other communication where audio signals may be exchanged. A real-time communication session as used herein is a broad term encompassing as its plain and ordinary meaning, including but not limited to, one or more objects, which may be stored in and/or are executable by hardware, and which may enable communication clients coupled to the one or more objects to exchange information. The one or more objects may include data and/or provide functionality of a real-time communication session as described herein.

Participants may engage in the real-time communication session using a variety of communication devices that enable one or more forms of communication. Examples of such communication devices include plain old telephone service (POTS) phone 110, laptop computer 112, personal digital assistant (PDA) 118, desktop computer 120, and cellular phone 122. Other examples of such communication devices that may be used include tablet computers, pagers, integrated devices such as so-called "smartphones," television set-top boxes, voice over internet protocol (VOIP) phones, and watches. Users of the communication devices may join and participate in the real-time communication session through network 104. Network 104 may represent various communication channels, such as a wired computer network, wireless computer network, cellular communications network, POTS network, television network, and combinations thereof.

As discussed, server 130 may host, administrate, or otherwise facilitate one or more real-time communication sessions between the communication devices over network 104. To communicate over network 104, server 130 may include one or more network interfaces 132. Details of network interfaces that server 130 may utilize in accordance with techniques of this disclosure are described more fully with respect to FIG. 2 below. Server 130 may also include collaboration module 134 to host real-time communication sessions between the communication devices. Collaboration module 134 may be operable to receive, grant, and deny requests from the communication devices to join a real-time communication session. Additionally, collaboration module 134 may host the real-time communication session by receiving communication data (such as audio data 124, as well as video and other types of data) from each communication device, and distributing the communication data to the remaining communication devices participating in the real-time communication session.

Collaboration module 134 may distribute audio data 124 in a variety of ways. In some examples, collaboration module 134 may distribute a separate audio stream associated with each communication device in the real-time communication session. For example, collaboration module 134 may receive an audio stream associated with a user of laptop computer 112 (e.g., the audio stream may be captured by a microphone of laptop computer 112). Collaboration module 134 may then use the one or more network interfaces 132 to distribute the audio stream to all of the communication devices in the real-time communication session except for laptop computer 112, namely communication devices 110, 118, 120, and 122. In other examples, collaboration module 134 may receive an audio stream from each communication device, and combine the audio streams into a single audio stream. Collaboration module 134 may then distribute the combined audio stream to all of the communication devices in the real-time communication session.

As discussed, in some scenarios, two or more communication devices in the real-time communication session may be in approximately the same vicinity, sometimes within audible range of one another. In the example of FIG. 1, POTS phone 110 and laptop computer 112 are illustrated as being at shared location 108. Shared location 108 may, in some examples, represent an office location, a conference room, or the like. For example, shared location 108 may represent adjacent cubicles at an office. In this scenario, a microphone of POTS phone 110 may receive audio from a user of laptop computer 112 in addition to audio from a user of POTS phone 110. Additionally, the user of POTS phone 110 may be able to hear the user of laptop computer 112 directly, as both users are in within audible range of one another.

In this scenario, when collaboration module 134 distributes audio data 124, the user of POTS phone 110 may hear the user of laptop computer 112 twice. That is, the user of POTS phone 110 hears the user of laptop computer 112 directly because they are physically within audible range of each other, and the user of POTS phone 110 hears the user of laptop computer 112 again after a time delay as part of an audio stream POTS phone 110 outputs, which was received from collaboration module 134. The user of POTS phone 110 may find the recurring audio (which may simulate an echo) to be disorienting and a nuisance while participating in the real-time communication session. For purposes of this disclosure, this type of recurring audio may be referred to as "feedback." To prevent or mitigate such effects of feedback, collaboration module 134, and components thereof, may implement techniques of this disclosure to perform two-way muting of various pairs of communication devices.

In the specific example of FIG. 1, collaboration module 134 has been enhanced to include two-way mute module 136 and voice recognition module 138. More specifically, two-way mute module 136 may implement techniques of this disclosure to identify pairs of communication devices that are susceptible to feedback. Portions of audio data 124 intended for the identified feedback pairs may be muted for each respective communication device in the pair. For example, two-way mute module 136 may identify muting condition 106 between POTS phone 110 and laptop computer 112.

Two-way mute module 136 may identify muting condition 106 in a variety of ways. In one example, two-way mute module 136 may detect location identifiers associated with POTS phone 108 and laptop computer 112. For example, two-way mute module 136 may detect a caller identification number (caller ID) associated with POTS phone 110. The caller ID of POTS phone 110 may be associated with a particular location, such as a phone jack at shared location 108. Similarly, two-way mute module 136 may detect an Internet Protocol (IP) address assigned to laptop computer 112. The IP address of laptop computer 112 may be associated with an Ethernet jack that is known to be physically proximate to the phone jack to which POTS phone 110 is connected. Two-way mute module 136 may use the location identifiers and the known proximity to detect muting condition 106. More specifically, in this case, muting condition 106 may indicate that the respective users of POTS phone 110 and laptop computer 112 are likely to experience feedback from one another while both users participate in the real-time communication session.

To prevent feedback, two-way mute module 136 may transmit audio data 124 such that POTS phone 110 does not receive audio data that originated from laptop computer 112, and vice-versa (for purposes of this disclosure, referred to as a "two-way mute"). By virtue of the two-way mute, the user of POTS phone 110 may be able to hear the user of laptop computer 112 directly (due to their proximity), but may not receive the portion(s) of audio data 124 that cause feedback. Similarly, the user of laptop computer 112 may be able to hear the user of POTS phone 110 without missing relevant information, but may not experience the inconveniences caused by feedback.

As shown in FIG. 1, POTS phone 110 and laptop computer 112 may receive separate communication streams while in the real-time communication session. More specifically, POTS phone 110 may receive POTS feed 114, and laptop computer 112 may receive laptop feed 116. POTS feed 114 may include audio data 124 with any audio originating from laptop computer 112 removed, with volume reduced to an inaudible level, or otherwise muted. Similarly, laptop feed 116 may not include audible levels of audio data originating from POTS phone 110. On the other hand, each of PDA 118, desktop computer 120, and cellular phone 122 receive approximately identical communication streams in this example, namely audio feeds 126A-126C (collectively, "audio feed 126"). Additionally, server 130 may cause each instance of audio feed 126 to differ slightly to avoid feedback caused by a participant's own speech. For example, POTS phone 110 may receive full audio feed without audio data that originated from POTS phone 110. Similarly, PDA 118 may receive audio feed 126 without audio data that originated from PDA 118, and so on. Two-way mute module 136 may remove audio data associated with an originating communication device by muting or any other technique known in the art. Audio feed 126 may include audio data originating from each communication device in the real-time communication session. Because none of PDA 118, desktop computer 120, and cellular phone 122 have a muting condition with respect to another communication device, two-way mute module 136 may permit collaboration module 134 to transmit audio feed 126 to each.

Collaboration module 134 may use criteria other than location identifiers to detect muting condition 106. For example, FIG. 1 shows collaboration module 134 comprising voice recognition module 138. Voice recognition module 138 may identify the voices of users of each communication device, and associate each voice with the corresponding communication device. Additionally, voice recognition module 138 may detect duplication of an identified voice in one or more audio signals generated by a communication device.

For example, voice recognition module 138 may identify a voice of the user speaking into POTS phone 110 and associate that voice with POTS phone 110. Similarly, voice recognition module 138 may identify a voice of the user using laptop computer 112 and associated that voice with laptop computer 112. In an example where POTS phone 110 and laptop computer 112 are within audible range of each other, both POTS phone 110 and laptop computer 112 may detect and transmit audio containing the voices of both users. In this example, voice recognition module 138 may detect the voice associated with POTS phone 110 in the audio data originating from laptop computer 112, and vice-versa. If voice recognition module 138 detects the voice of a user originating from POTS phone 110 and/or laptop computer 112 that is not associated with the respective communication device, voice recognition module 138 may detect muting condition 106. Based on detecting muting condition 106, voice recognition module 138 may cause two-way mute module 136 to perform a two-way mute between POTS phone 110 and laptop computer 112. In this manner, voice recognition module 138 may cause two-way muting between communication devices based on voice recognition and detection.

Two-way mute module 136 may also enable one or more communication devices in the real-time communication session to override a two-way mute. In some scenarios, such as the transitive mute between POTS phone 110 and the tablet computer, one or both users may wish to override the two-way mute. For example, the users may be positioned in such a way that one or both users may not be able to hear the other with sufficient clarity. In such a scenario, one or both users may transmit an unmute request to server 130. Two-way mute module 136 may either cease the two-way mute entirely, or cease muting in only one direction. In this manner, two-way mute module 136 may allow participants of the real-time communication session to override a two-way mute in one or both directions based on each participant's preferences.

As described with respect to FIG. 1, techniques of this disclosure may enable two-way muting of communication devices in a real-time communication session. In various implementations, a device may perform two-way muting based on various criteria, such as known locations, IP addresses, participant requests, etc. The two-way muting techniques described herein may provide one or more advantages, such as reduction of feedback and other potentially unwanted audio. In this manner, techniques of this disclosure may enhance the audio quality and ease of use of multi-participant real-time communication sessions.

Figure 2:
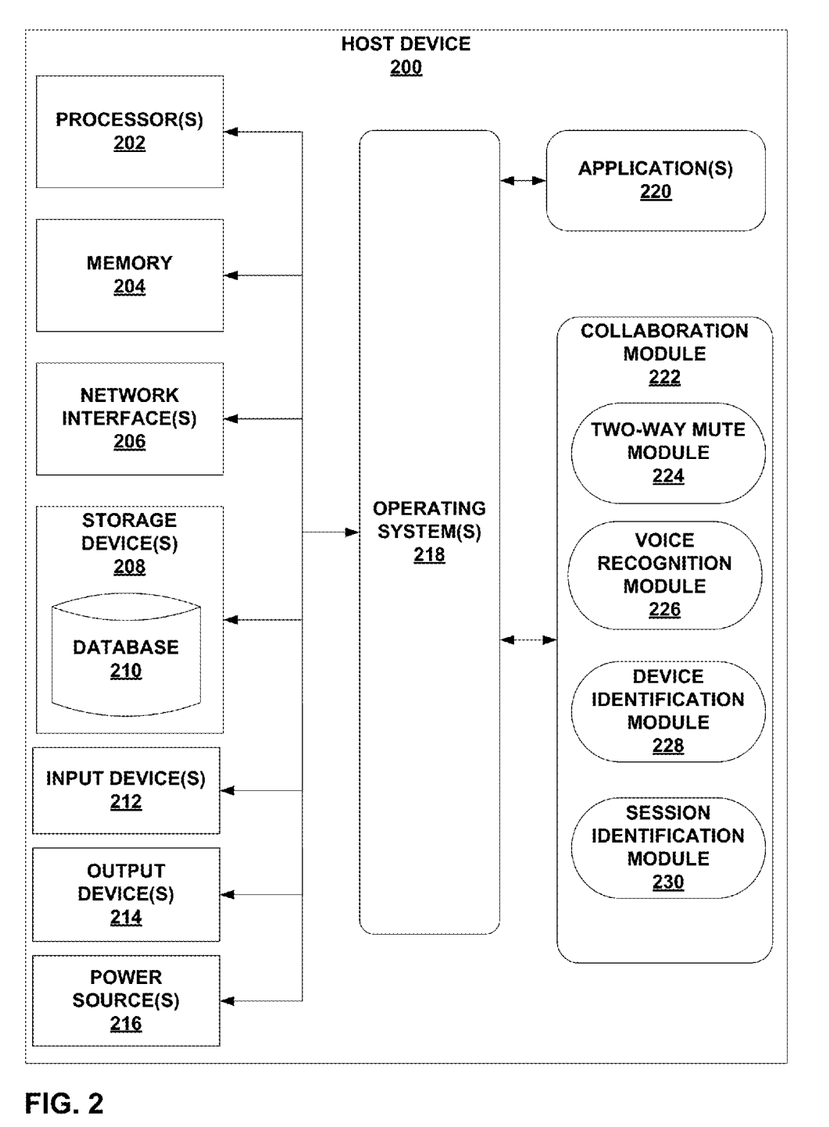
FIG. 2 is a block diagram illustrating further details of a host device that may host a multi-participant real-time communication session and perform two-way muting of audio output provided by participant communication devices, in accordance with one or more aspects of the present disclosure.

FIG. 2 is a block diagram illustrating further details of a host device 200 that may host a multi-participant real-time communication session and perform two-way muting of participants, in accordance with one or more aspects of the present disclosure. Host device 200 may be one non-limiting example of server 130 described with respect to FIG. 1. Host device 200 and components thereof may be operable to host and administrate real-time communication sessions between multiple communication devices, and perform two-way muting functionalities provided by techniques of the present disclosure.

As shown in the specific example of FIG. 2, host device 200 includes one or more processors 202, memory 204, one or more network interfaces 206, one or more storage devices 208, one or more input devices 212, one or more output devices 214, and one or more power sources 216. Host device 200 also includes one or more operating systems 218. Host device 200 may include one or more applications 220 and collaboration module 222. Collaboration module 222 may include two-way mute module 224, voice recognition module 226, device identification module 228, and session identification module 230, each of which may be executable by host device 200. In various examples, one or more operating systems 218 and/or applications 220 may include one or more of collaboration module 222, two-way mute module 224, voice recognition module 226, device identification module 228, and session identification module 230. Operating systems 218 and applications 220, and collaboration module 222 may also be executable by one or more processors 202. Each of components 202, 204, 206, 208, 210, 212, 214, 216, 218, 220, 222, 224, 226, 228, and 230 may be interconnected (physically, communicatively, and/or operatively) for inter-component communications.

Processors 202 may be configured to implement functionality and/or process instructions for execution in host device 200. Processors 202 may be capable of processing instructions stored in memory 204 or instructions stored on the one or more storage devices 208. One or more processors 202 may be configured to perform functionalities provided by operating systems 218, applications 220, and collaboration module 222 and components thereof.

Memory 204 may be configured to store information within host device 200 during operation of host device 200 and/or components thereof. Memory 204 may, in some examples, be described as tangible or a non-transitory computer-readable storage medium. In some examples, memory 204 is a temporary memory. Memory 204 may also, in some examples, be described as a volatile memory, meaning that memory 204 does not maintain stored contents when host device 200 is turned off. Examples of volatile memories include random access memories (RAM), dynamic random access memories (DRAM), static random access memories (SRAM), and other forms of volatile memories known in the art. In some examples, memory 204 may be used to store program instructions for execution by processor(s) 202. Memory 204 may be used by software or applications running on host device 200 (for example, one or more of applications 220) to temporarily store information during program execution.

One or more storage devices 208 may also include one or more tangible or non-transitory computer-readable storage media. Storage devices 208 may be configured to store large amounts of information. Storage devices 208 may further be configured for long-term storage of information. In some examples, storage devices 208 may include non-volatile storage elements. Examples of such non-volatile storage elements may include magnetic hard discs, solid state discs (SSDs), optical discs, floppy discs, flash memories, or forms of electrically programmable memories (EPROM) or electrically erasable and programmable (EEPROM) memories.

Storage device(s) 208 may store a database 210. Database 210 may include, among other information, data associated with participants, communication devices, muting information, or session information pertaining to one or more real-time communication sessions. For example, database 210 may include names of participants, device names and/or media access control (MAC) addresses of communication devices, one or more service set identifiers (SSIDs) associated with wireless connections used by communication devices, and geographic coordinates associated with communication devices. Database 210 may also include information collected and/or generated by collaboration module 222 and components thereof. For example, database 210 may include two-way muting history, voice samples, mappings of the voice samples to communication devices, and past/present session information. In other examples, database 210 may be stored at a remote location, and accessible through network interfaces 206 through methods commonly known as "cloud computing."

Host device 200 may also include one or more network interfaces 206. Host device 200 may utilize one or more network interfaces 206 to communicate with external devices via one or more networks (for example, network 104 shown in FIG. 1). In one example, one or more network interfaces 206 may correspond to an interface for receiving data from communication devices (for example, the multiple communication devices of FIG. 1). In some examples, host device 200 may include a plurality of either or both input and output interfaces. In some examples, network interfaces 206 may include separate input and output network interfaces of network interfaces 206. In other examples, input and output interfaces may be may be functionally integrated.

One or more network interfaces 206 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 206 may be an optical transceiver, a radio frequency transceiver, or any other type of device that can send and receive information. Examples of such network interfaces may include Bluetooth®, 3G and WiFi® radios in mobile computing devices as well as a Universal Serial Bus (USB). Examples of such wireless networks may include WiFi®, Bluetooth®, and 3G. In some examples, host device 200 may utilize network interface(s) 206 to wirelessly communicate with an external device, such as the communication devices described with respect to FIG. 1.

Host device 200 may also include one or more input devices 212. Input devices 212 may be configured to receive input, for example, from a user through tactile, audio, or video channels. Examples of input devices 212 may include a touch-sensitive display, a mouse, a keyboard, a microphone, video camera, or any other type of device for detecting a command from a user. One or more output devices 214 may also be included in host device 200. Output devices 214 may be configured to provide output to a user by tactile, audio, or video channels. Output devices 214 may include a touch-sensitive display, speakers, tactile feedback devices, and may utilize a sound card, a video graphics adapter card, or any other type of device for converting a signal into an appropriate form understandable to humans or machines. Additional examples of output devices 214 may include a speaker, a cathode ray tube (CRT) monitor, a liquid crystal display (LCD), or any other type of device that can provide output to a user. In some examples, one or more input devices 212 and one or more output devices 214 comprise a single device, such as a touch-screen.

Host device 200 may include one or more power sources 216, which may provide power to host device 200. The one or more power sources 216 may be one or more batteries, which may be rechargeable. The one or more batteries may be made from nickel-cadmium, lithium-ion, or any other suitable material. In other examples, host device 200 may be connected to an electrical grid through one or more power sources 216, for example, via a power outlet or telephone line. In some examples, one or more power sources 216 may include a transformer and/or converter.

Host device 200 may implement one or more operating systems 218. One or more operating systems 218 may control the operation of components of host device 200. For example, operating systems 218 may facilitate the interaction of applications 220 or collaboration module 222 with processor(s) 202, memory 204, network interface(s) 206, storage device(s) 208, input device(s) 212, output device(s) 214, and one or more batteries 216. Any software or hardware modules implemented within or executed by host device 200 may be implemented or contained within, operable by, executed by, or be operatively or communicatively coupled to components of host device 200. For example, operating systems 218, applications 220, and collaboration module 222 may be coupled as described above to one or more of processor(s) 202, memory 204, network interface(s) 206, storage device(s) 208, input device(s) 212, and output device(s) 214.

Collaboration module 222 may enable host device 200 to host, administer, and otherwise participate in real-time communication sessions involving multiple communication devices. Real-time communication sessions may enable communication in various forms, including audio conference calls, video conferences, text-based chatting, document sharing with real-time updating, collaborative web-surfing, and various other forms. Real-time communication sessions may be distinct from one another in terms of their timing, participant pools, and discussion content. Additionally, participants using the communication devices may leave and join a real-time communication session while the particular real-time communication session is in progress. As discussed, in a real-time communication session that includes audio communications, multiple participant communication devices may be physically within audible range of one another, potentially causing feedback.

One or more of two-way mute module 224, voice recognition module 226, device identification module 228, and session identification module 230 may function to prevent feedback among participant communication devices in a real-time communication session. In some instances, two-way mute module 224 may perform a two-way mute based on historical data. For example, if two-way mute module 224 has performed a two-way mute (on any basis) between two identified communication devices in a threshold percentage of past real-time communication sessions, two-way mute module 224 may continue to perform the same two-way mute based on the past real-time communication sessions. In some implementations, host device 200 may store some or all information related to past real-time communication sessions to database 210. In these and other implementations, host device 200 may store information related to past real-time communications sessions to a remote location (e.g., cloud storage) that is accessible through one or more network interfaces 206.

To track historical data related to past real-time communication sessions and two-way mutes, two-way mute module 224 may utilize functionalities provided by device identification module 228 and session identification module 230. More specifically, device identification module 228 may assign device identifications (IDs) to communication devices based on various criteria, such as static and/or dynamic IP addresses, SSIDs of wireless connections to which a communication device is coupled, MAC addresses, device names, geographic coordinates, user-entered information, etc. Additionally, session identification module 230 may draw distinctions between separate real-time communication sessions. More specifically, session identification module 230 may assign a distinct meeting identifier to each real-time communication session. In some examples, the meeting identifier may be an alphanumeric string that functions as a name of the corresponding real-time communication session. For example, an alphanumeric string such as "Status_Meeting_ Jan_15_2012" may serve as a descriptive name for a real-time communication session.

Two-way mute module 224 may store historical muting data, sorted by device IDs and meeting identifiers, to storage devices 208 (e.g., in database 210). Based on the stored historical data, two-way mute module 224 may perform two-way muting of selected communication devices in future real-time communication sessions. For example, if two-way mute module 224 detects that it muted POTS phone 110 and laptop computer 112 (e.g., on the basis of location identifiers) in three of five past real-time communication sessions that both POTS phone 110 and laptop computer 112 participated in, two-way mute module 224 may, by default, two-way mute these devices in future real-time communication sessions. In this example, the threshold percentage is 60%, over a sample size of 5 real-time communication sessions. In other examples, the threshold percentage and/or sample size may vary. In still other examples, two-way mute module 224 may glean consecutive muting statistics from the historical data. For example, if two-way mute module 224 detects that the communication devices were two-way muted in the last two real-time communication sessions (regardless of how many past sessions both devices were in), two-way mute module 224 may perform a default two-way mute. As discussed, either communication device may have the capability to override the default two-way mute (either partially or fully) if an associated user so wishes.

Voice recognition module 226 is one non-limiting example of voice recognition module 138 illustrated in FIG. 1. Similar to voice recognition module 138, voice recognition module 226 may identify a user's voice and associate the user's voice with an originating communication device. If voice recognition module 226 detects an unassociated voice in audio signals originating from a communication device, voice recognition module 226 may cause two-way mute module 224 to mute the pertinent communication devices. FIG. 2 illustrates only one implementation of collaboration module 222 and its components, and various other implementations are possible. For example, two-way mute module 224 may perform the functionalities attributed to device identification module 228 and/or session identification module 230. In accordance with this disclosure, several permutations are possible in terms of the functionalities enabled by the components illustrated.

Figure 3:
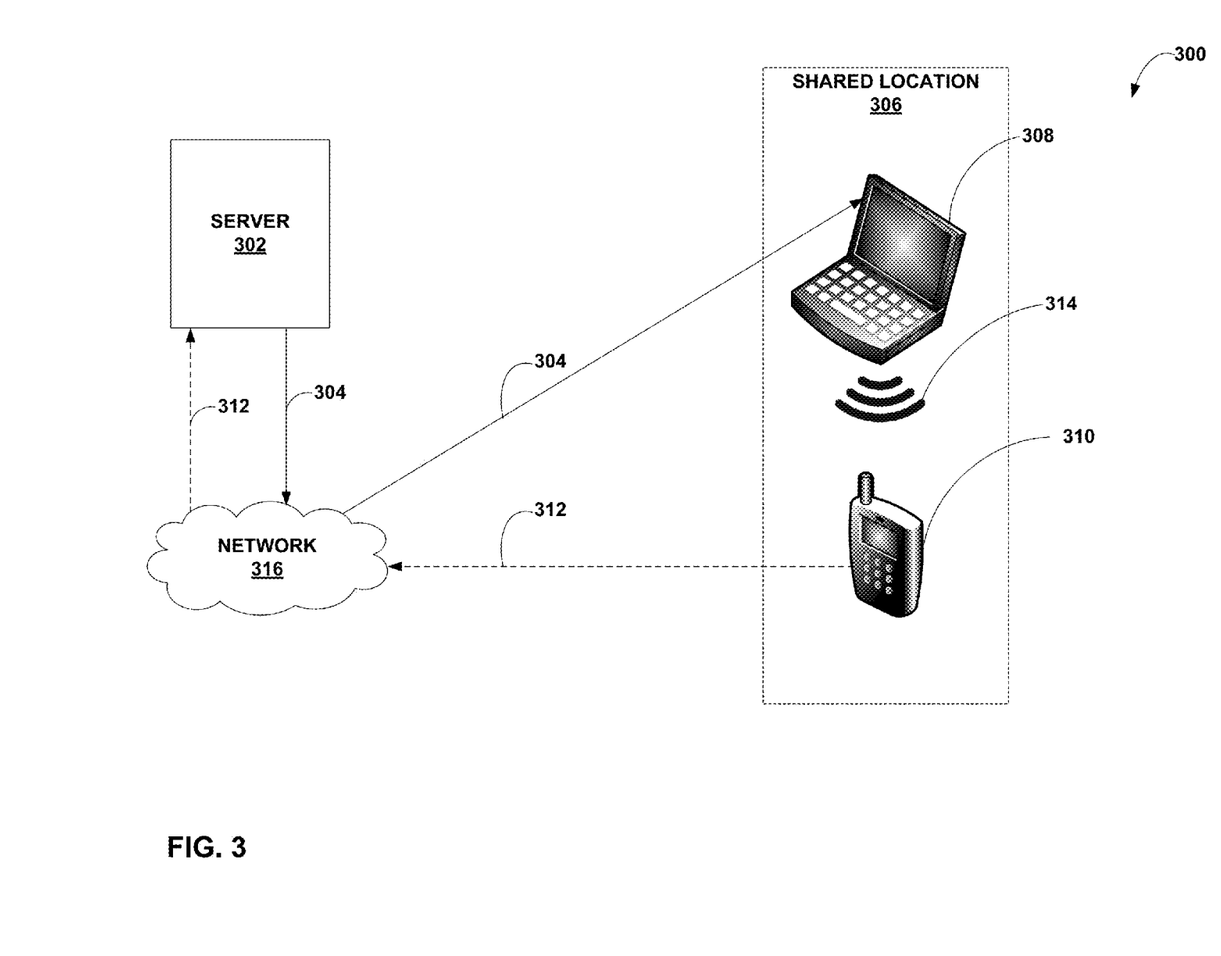
FIG. 3 is a conceptual diagram illustrating an example of a server that may perform two-way muting of audio output provided by participant communication devices by sending a test signal and receiving feedback of the test signal, in accordance with one or more aspects of the present disclosure.

FIG. 3 is a conceptual diagram illustrating an example of a server 302 that may perform two-way muting by sending a test signal 304 and receiving feedback of test signal 304, in accordance with one or more aspects of the present disclosure. Server 302 may host, administer, and otherwise participate in a real-time communication session with multiple communication devices using network 316. For ease of illustration purposes only, FIG. 3 illustrates only two such communication devices, namely laptop computer 308 and mobile phone 310. Laptop computer 308 and mobile phone 310 may be within audible range of one another, (e.g., at a shared location 306).

FIG. 3 illustrates an example implementation of techniques of this disclosure, which enables detection of a muting condition based on a test signal, such as test signal 304. More specifically, server 302 may send test signal 304 to one or more selected communication devices, such as laptop computer 308. Test signal 304 may include one or more audio signals with characteristics known to server 302 and components thereof. Examples of such characteristics include pitch, timbre, shrillness, frequency, wavelength, amplitude, period, intensity, sound pressure, or other characteristics. Test signal 304 may serve as a substitute and/or supplement to the detection techniques described earlier, such as techniques that use voice recognition technologies.

By virtue of being physically at shared location 306, laptop computer 308 and mobile phone 310 may be within audible range of one another. As a result, a microphone of mobile phone 310 may pick up one or more sounds emanating from laptop computer 308 (e.g., from a multimedia speaker of or coupled to laptop computer 308). When or after laptop computer 308 receives test signal 304, laptop computer 308 may emit playback 314. Playback 314 may include one or more audio signals associated with test signal 304. Based on settings configured by a user of laptop computer 308, playback 314 may have various volume levels.

One or more microphones of or coupled to mobile phone 310 may receive a portion of playback 314, based on proximity of the one or more microphones to laptop computer 308. As a user of mobile phone 310 may be a current participant in the real-time communication session, mobile phone 310 may send audio signals to server 302 over network 316. Additionally, based on the proximity to laptop computer 308, the audio signals may include audio associated with playback 314. More specifically, mobile phone 310 may transmit residual audio 312 to server 302. Residual audio 312 may indicate to server 302 that mobile phone 310 is within audible range of laptop 308, and thus a muting condition exists between laptop computer 308 and mobile phone 310. Server 302 may then perform a two-way mute between laptop computer 308 and mobile phone 310. Server 302 may transmit test signal 304 at various stages or junctures in the real-time communication session. Some such examples include detection of proximate IP addresses assigned to laptop computer 308 and mobile phone 310, proximate global positioning system (GPS) coordinates, a user request, similar times of joining the real-time communication session, etc. In this manner, techniques of this disclosure may enable preventive two-way muting preceding a real-time communication session or at an early stage of the real-time communication session.

In some instances, server 302 may perform an operation referred to herein as "transitive muting." In some examples, three or more communication devices may be within audible range of one another. For example, a third communication device, such as a tablet computer, may be at shared location 306. In this example, server 302 may detect muting condition 106 based on location identifiers, as discussed above and perform a two-way mute between mobile phone 310 and laptop computer 308. Similarly, server 302 may detect a muting condition between laptop computer 308 and the tablet computer, and perform a two-way mute between laptop computer 308 and the tablet computer.

Based on the fact that laptop computer 308 is part of two two-way mutes (that is, with mobile phone 310 and the tablet computer), server 306 may perform a third two-way mute based on the two-way mutes of laptop computer 308. More specifically, server 302 may perform a two-way mute between the two communication devices that are two-way muted with laptop computer 308. In this example, server 302 performs a two-way mute for mobile phone 310 and the tablet computer because laptop computer 308 is two-way muted with both mobile phone 310 and the tablet computer. The third two-way mute may be known as a transitive mute, based on the fact that server 302 did not directly detect a direct muting condition between mobile phone 310 and the tablet computer.

In some implementations, server 302 may perform a transitive mute based on the perceived strength (e.g., volume, clarity, etc.) of a voice of a participant who is not associated with the sending communication device. In one example, laptop computer 308 may also transmit the voice of the participant using the tablet computer. In this example, server 302 may discern the strength of the voice as sent by laptop computer 308, and determine whether or not to transitively mute mobile phone 310 and the tablet computer. For instance, if the strength of the voice is below a threshold strength, server 302 may decline to perform the transitive muting. On the other hand, if the strength of the voice meets or exceeds the threshold strength, two-way mute module may transitively mute mobile phone 310 and the tablet computer. Additionally, server 302 may use voice strength determinations to perform two-way mutes that are not transitive in nature. Based on the discerned strengths, server 302 may make different determinations with respect to the original two-way mute and the transitive mute.

Figure 4:
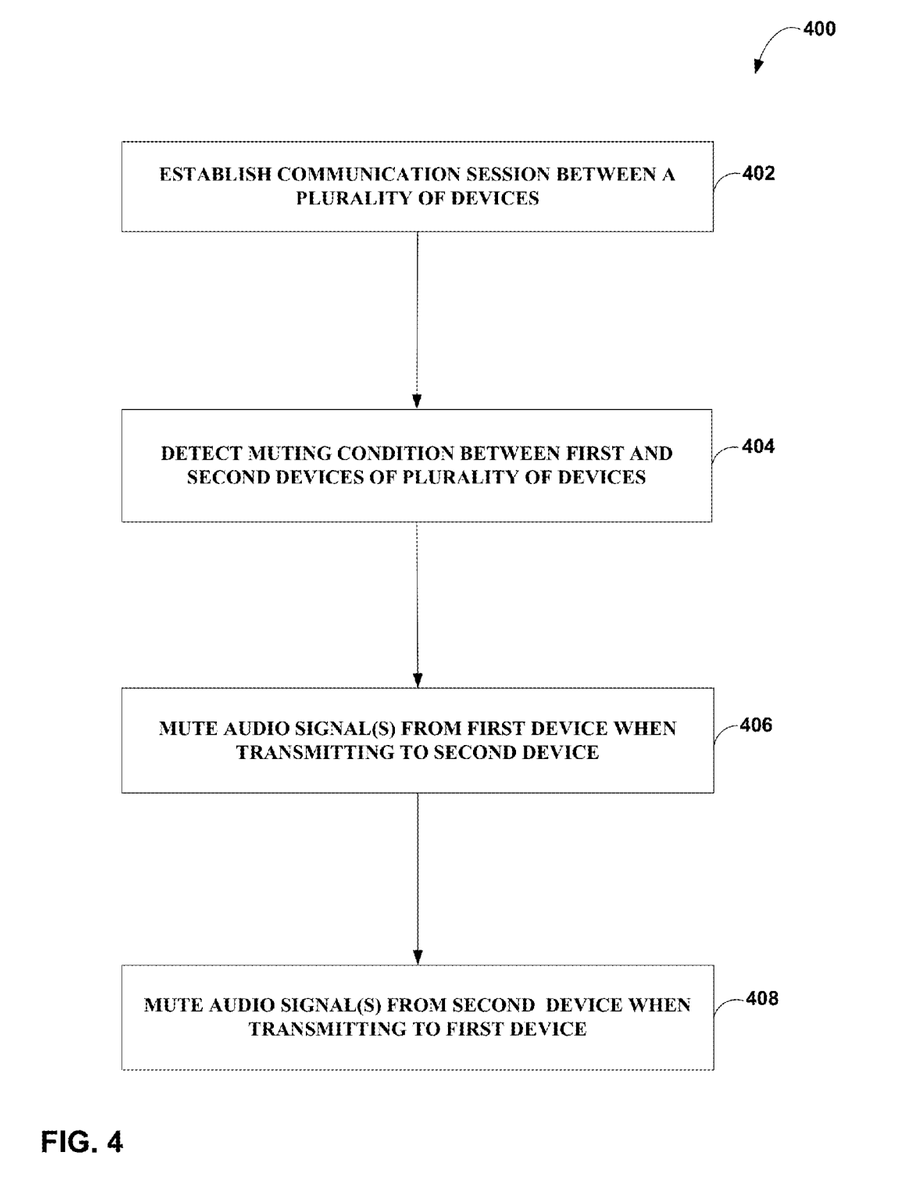
FIG. 4 is a flowchart illustrating an example process that may be performed by a computing device to perform two-way muting of audio output provided by participant communication devices, in accordance with one or more aspects of the present disclosure.

FIG. 4 is a flowchart illustrating an example process 400 that may be performed by a computing device to perform two-way muting of participants, in accordance with one or more aspects of the present disclosure. Process 400 may be performed by any computing device described herein, such as server 130 of FIG. 1, host device 200 of FIG. 2, and server 302 of FIG. 3. Process 400 may begin when a host device establishes a real-time communication session between a plurality of devices (402). The real-time communication session may be a real-time communication session, as described above, or any other type of session that enables multi-participant communication. In many examples, the real-time communication session may provide audio communication capabilities, with or without supplementary communication modes.

Process 400 may then include detecting a muting condition between a first communication device and a second communication device of the plurality of communication devices (404). The detection may be implemented in various ways, as discussed above with respect to specific examples. A few such examples include voice recognition-based detection, test signal echo-based detection, and the use of location identifiers. In some examples, the host device may use the muting condition to determine a combination of two conditions, namely, that 1) the first communication device need not receive audio data associated with the second communication device while in the real-time communication session, and 2) the second communication device need not receive audio data associated with the first communication device while in the real-time communication session.

The host device may then mute one or more audio signals from the first device when transmitting audio to the second device (406). Muting one or more audio signals from the first device when transmitting audio to the second device may constitute a one-way mute, i.e., the first device may continue to receive audio signals originating from the second device, but not vice-versa. To complete a two-way mute, the host device may mute one or more audio signals from the second device when transmitting audio to the first device (408).

Though described largely with respect to a server device, one or more client devices may implement the techniques of this disclosure. As discussed, a first client device may receive audio signals from a second client device. In some examples, the first client device may itself perform a one-way mute or two-way mute based on the techniques described above. Implementing these techniques on a client device may provide certain advantages. For example, the first and second client devices may communicate using a network architecture that does not rely on a server (such as peer-to-peer networks, ad-hoc networks, and others). In such examples, it may be advantageous for one or more of the client devices to be enabled to implement the techniques described herein.

In some instances, the host device may determine a first location identifier and a second location identifier (associated with the first and second communication devices, respectively) in implementing process 400. Examples of location identifiers include an internet protocol (IP) address, a service set identifier (SSID) of a wireless internet connection, a media access control (MAC) address, a device name, a caller identification number (caller ID), and one or more geographic coordinates, among others. In some implementations, the host device may assign a meeting identifier (e.g., an alphanumeric string) to the real-time communication session, and send the meeting identifier to each communication device of the plurality of communication devices. Additionally, the host device may send one or more signals representing a notification to one or both of the first and second communication devices, where the notification includes an indication of the muting condition.

The host device may, in some instances, receive an unmute request from the first communication device. Responsive to receiving the unmute request, the host device may unmute the audio data (e.g., "first audio signals") output by the first communication device, such that the host device sends the first audio signals to the second communication device. In some instances (referred to as "transitive muting"), the host device may detect a second muting condition between the second communication device and a third communication device of the plurality. Responsive to the second muting condition, the host device may mute "second" audio signals output by the second communication device such that the host device refrains from sending the second audio signals to the third communication device, and mute "third" audio signals output by the third communication device such that the host device refrains from sending the third audio signals to the second communication device. Additionally, the host device may mute the first audio signals before sending to the third communication device, and mute the first audio signals before sending to the third communication device (effecting a "transitive muting" between the first and third communication devices).

In some implementations, the host device may detect the muting condition by sending test audio signal to the first communication device, and send an instruction to the first communication device to output audio data associated with the test signal over a time period. The host device may then receive second audio signals from the second communication device, where the second audio signals are generated over at least a portion of the time period. The host device may detect at least one sound in the second audio signals, such that the detected sound is associated with the test audio signal. The host device may generate the muting condition between the first and second communication devices based on detecting the sound associated with the test audio signal. In some implementations, the host device may terminate the real-time communication (which, in this case, is considered a first real-time communication session), and subsequent to the termination, establish a second real-time communication session between a second plurality of communication devices that also includes the first and second communication devices. Based on the muting condition between the first and second communication devices in the first real-time communication session, the host device may mute the first and second audio signals in the second real-time communication session.

The host device may also send, to the second communication device, video signals and/or text entries output by the first communication device. In some examples, the first audio signals output by the first communication device may conform to at least one of a voice-grade signal, a voice over Internet protocol (VOIP) signal, an integrated services digital network (ISDN) signal, and a mobile telecommunication signal. In some examples, detecting the muting condition may include receiving, by the host device, one or both of a one-way and two-way mute request from the first communication device. The one-way mute request may correspond to a muting of only the second audio signals output by the second communication device. The two-way mute request may correspond to a combination of the muting of only the second audio signals output by the second communication device and a muting of the first audio signals output by the first communication device.

Figure 5:
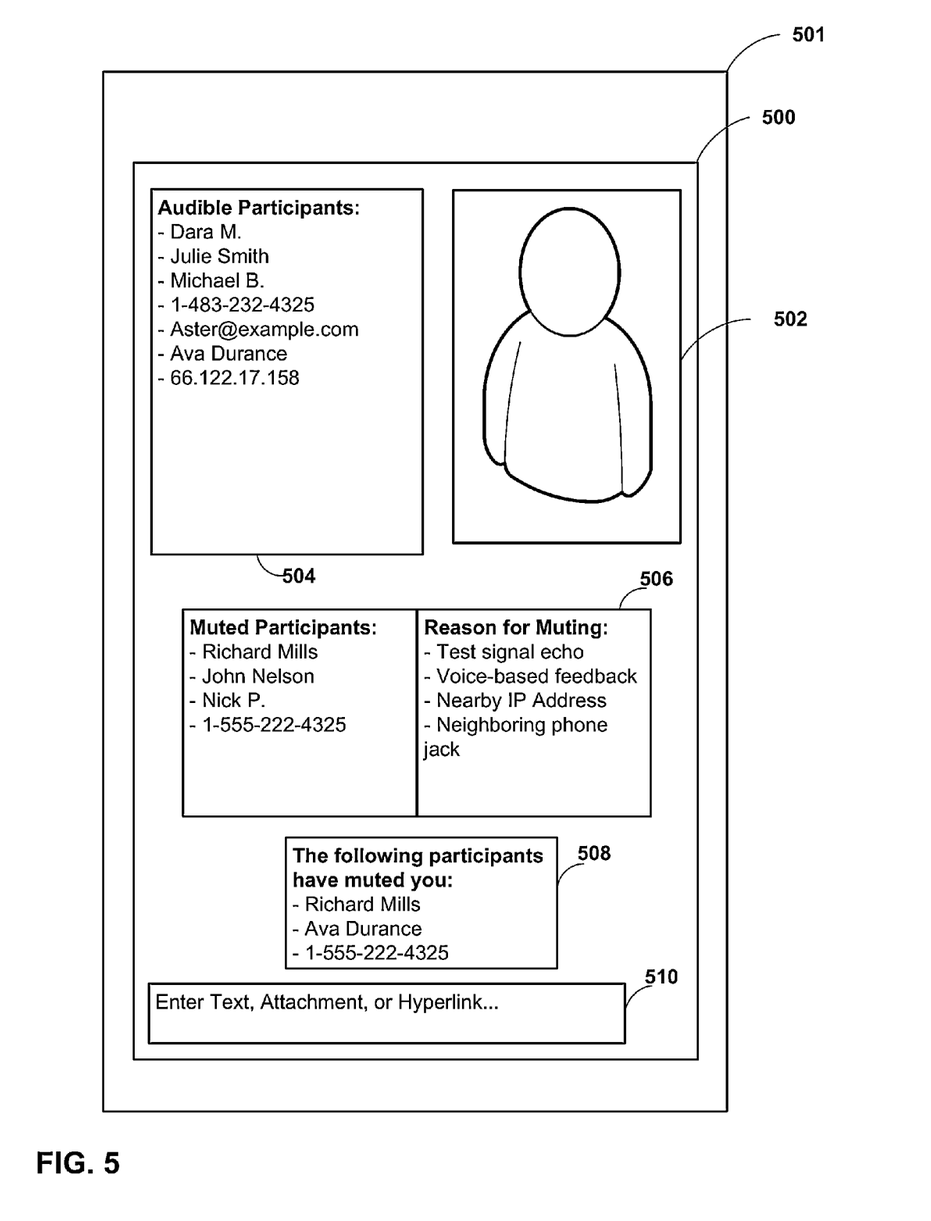
FIG. 5 is a conceptual diagram illustrating details of an example graphical user interface (GUI) displayed by a communication device, in accordance with one or more aspects of the present disclosure.

FIG. 5 is a conceptual diagram illustrating details of an example graphical user interface (GUI) 500 displayed by communication device 501, in accordance with one or more aspects of the present disclosure. GUI 500 includes elements that may be provided by functionalities disclosed herein, such as functionalities performed by server 130 of FIG. 1 and host device 200 of FIG. 2. Communication device 501 may include, be, or be part of several types of devices known in the art, such as mobile phones (e.g., smartphones), laptop computers and variants thereof (e.g., netbooks, ultrabooks, etc.), tablet computers, desktop computers, and others.

GUI 500 includes elements such as audible list 504, visual module 502, mute list 506, mute notification 508, and text chat module 510. As discussed, techniques of this disclosure may provide for real-time communication sessions that enable multiple channels of communication, such as video conferencing and text-based chat. Visual module 502 may facilitate video conferencing. For example, if a participant uses a communication device equipped with a webcam while in the real-time communication session, visual module 502 may play video of the participant (captured by the webcam of the respective communication device) while the participant is speaking or otherwise recognized as active. In other examples, visual module 502 may include a still image associated with an active participant, if the respective communication device used by an active participant has supplied a still image but does not use a webcam. In still other examples, visual module 502 may be blank or include a default image, if the respective communication device associated with an active participant has provided neither a still image nor webcam-captured video. GUI 500 may also include text chat module 510 which enables text-based chatting while in the real-time communication session. A user of a communication device may enter text, file attachments, and hyperlinks in text chat module 510 to communicate with other participant communication devices in the real-time communication session.

Audible list 504 may indicate to the user some or all of the participant communication devices whose audio feeds the user may hear. More specifically, the host device may send audio feeds associated with participant communication devices in audible list 504 in unmuted form to the device displaying GUI 500. As illustrated, any of the host device, the originating communication device, and communication device 501 may identify participant communication devices in several ways, including full names, partial names, phone numbers, email addresses, and IP addresses, to name just a few. If the user indicates that any of the participant communication devices in audible list 504 are directly audible, the user may submit an explicit mute request with respect to those participants to the host device. The host device may then perform a one-way or two-way mute, based on criteria selected by the user and/or the host device.

GUI 500 also includes mute list 506. Mute list 506 may include a list of participant communication devices in the real-time communication session whose audio feeds are muted before transmission to the communication device that displays GUI 500. Mute list 506 may include participant communication devices who are part of a one-way mute (i.e., those who receive the user's audio feed unmuted) as well as a two-way mute (i.e., those who receive the user's audio feed in muted form). As discussed, the host device may mute a communication device based on various types of muting conditions. In the example of FIG. 5, the host device may provide the user with a corresponding list of muting conditions. As shown, each participant communication device in mute list 506 is mapped to a corresponding muting condition (or "reason for muting").

In some implementations, the host device may send one or more mute notifications, such as mute notification 508, to the user. The host device may send mute notification 508 at each instance of a mute, may provide mute notification as a persistent GUI element that updates dynamically, or may send mute notification 508 at periodic mute intervals with consolidated lists of participants. Mute notification 508 may include instances of one-way as well as two-way mutes. In the example of FIG. 5, the communication device associated with "Ava Durance" is a party to a one-way mute, as Ava Durance is represented in audible list 504. On the other hand, the communication device associated with "Richard Mills" and a communication device identified with phone number "1-555-222-4325" are parties to a two-way mute, as both participants are represented in mute list 506.

Techniques described herein may be implemented, at least in part, in hardware, software, firmware, or any combination thereof. For example, various aspects of the described embodiments and/or examples may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium and/or a computer-readable storage device encoded with instructions. Instructions embedded or encoded in an article of manufacture including an encoded computer-readable storage medium and/or an encoded computer-readable storage device, may cause one or more programmable processors, or other processors, to implement one or more of the techniques described herein, such as when instructions included or encoded in the computer-readable storage medium and/or computer-readable storage device are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media. The term "non-transitory" may indicate that the storage medium is not embodied in a carrier wave or a propagated signal. In certain examples, a non-transitory storage medium may store data that can, over time, change (for example, in RAM or cache).

In situations in which the systems discussed herein may collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Various aspects of the disclosure have been described. Aspects or features of examples described herein may be combined with any other aspect or feature described in another example. These and other examples are within the scope of the following claims.

What is claimed is:

1. A method comprising:
 establishing, by a host device, a real-time communication session between a plurality of communication devices;
 sending, by the host device to a first communication device of the plurality of communication devices, a test audio signal to be output by the first communication device;
 receiving, by the host device, one or more audio signals output by a second communication device of the plurality of communication devices;

detecting at least one sound in the one or more audio signals output by the second communication device, wherein the at least one sound is associated with the test audio signal;

detecting a muting condition between the first communication device and the second communication device based at least in part on detecting the at least one sound associated with the test audio signal, wherein the muting condition is associated with a susceptibility of audio feedback between the first communication device and the second communication device during the real-time communication session;

determining, by the host device, based at least in part on the muting condition, that 1) the first communication device will not receive the one or more audio signals output by the second communication device during the real-time communication session, and 2) the second communication device will not receive one or more audio signals output by the first communication device during the real-time communication session;

responsive to detecting the muting condition:
muting the one or more audio signals output by the first communication device such that the second communication device does not receive the one or more audio signals output by the first communication device; and
muting the one or more audio signals output by the second communication device such that the first communication device does not receive the one or more audio signals output by the second communication device.

2. The method of claim 1, wherein the muting condition is based at least in part on a proximity between the first communication device and the second communication device, the method further comprising:
determining, by the host device, the proximity between the first communication device and the second communication device based at least in part on a first location identifier associated with the first communication device and a second location identifier associated with the second communication device.

3. The method of claim 2, wherein each of the first location identifier and the second location identifier includes at least one of an internet protocol (IP) address, a service set identifier (SSID) of a wireless internet connection, a media access control (MAC) address, a device name, a caller identification number (caller ID), and one or more geographic coordinates.

4. The method of claim 1, further comprising:
assigning, by the host device, a meeting identifier to the real-time communication session; and
sending, by the host device, one or more signals representing the meeting identifier to each communication device of the plurality of communication devices.

5. The method of claim 4, wherein the meeting identifier comprises an alphanumeric string corresponding to a name of the real-time communication session.

6. The method of claim 1, further comprising:
sending, by the host device, to at least one of the first communication device and the second communication device, an indication of the muting condition.

7. The method of claim 1, further comprising:
receiving an unmute request from the first communication device; and
responsive to receiving the unmute request, unmuting, by the host device, the one or more audio signals output by the second communication device and sending the one or more audio signals output by the second communication device to the first communication device.

8. The method of claim 7, further comprising:
responsive to receiving the unmute request, unmuting, by the host device, the one or more audio signals output by the first communication device and sending the one or more audio signals output by the first communication device to the second communication device.

9. The method of claim 1, wherein the muting condition comprises a first muting condition, the method further comprising:
detecting a second muting condition between the second communication device and a third communication device of the plurality of communication devices; and
responsive to detecting the second muting condition:
muting, by the host device, one or more audio signals output by the third communication device, wherein the host device refrains from sending the one or more audio signals output by the third communication device to the second communication device;
muting, by the host device, the one or more audio signals output by the second communication device, wherein the host device refrains from sending the one or more audio signals output by the second communication device to the third communication device;
muting, by the host device, the one or more audio signals output by the first communication device, wherein the host device refrains from sending the one or more audio signals output by the first communication device to the third communication device; and
muting, by the host device, the one or more audio signals output by the third communication device, wherein the host device refrains from sending the one or more audio signals output by the second communication device to the first communication device.

10. The method of claim 1, wherein detecting the muting condition further comprises:
identifying, by the host device, a voice of a first user in the one or more audio signals output by the first communication device, wherein the first user is associated with the first communication device;
identifying, by the host device, a voice of a second user in the one or more audio signals output by the second communication device, wherein the second user is associated with the second communication device; and
detecting, by the host device, in the one or more audio signals output by the first communication device, the voice of the second user.

11. The method of claim 1, wherein the real-time communication session is a first real-time communication session, the method further comprising:
terminating, by the host device, the first real-time communication session;
establishing, by the host device, subsequent to the termination of the first real-time communication session, a second real-time communication session between a second plurality of communication devices that includes the first communication device and the second communication device;
muting, by the host device, in the second real-time communication session, the one or more audio signals output by the first communication device, wherein the host device refrains from sending the one or more audio signals output by the first communication device to the second communication device, and wherein muting the one or more audio signals output by the first communication device is based at least in part on the muting condition of the first real-time communication session; and muting, by the host device, in the second real-time communication session, the one or more audio signals output by the second communication device, wherein the host device refrains from sending the one or more audio signals output by the second communication device to the first communication device, and wherein muting the one or more audio signals output by the second communication device is based at least in part on the muting condition of the first real-time communication session.

12. The method of claim 1, further comprising:
sending, by the host device and to the second communication device, one or more video signals output by the first communication device.

13. The method of claim 1, further comprising:
sending, by the host device and to the second communication device, one or more text entries output by the first communication device.

14. The method of claim 1, wherein the one or more audio signals output by the first communication device conform to at least one of a voice-grade signal, a voice over Internet protocol (VOIP) signal, an integrated services digital network (ISDN) signal, and a mobile telecommunication signal.

15. The method of claim 1, wherein detecting the muting condition further comprises:
detecting the muting condition responsive to receiving, by the host device, at least one of a one-way mute request and a two-way mute request, from the first communication device,
wherein the one-way mute request corresponds to a muting of only the one or more audio signals output by the second communication device, and
wherein the two-way mute request corresponds to the muting of a one or more audio first signals output by the first communication device in combination with the muting of the one or more audio signals output by the second communication device.

16. A computer-readable storage device comprising instructions for causing at least one processor of a host device to perform operations comprising:
establishing a real-time communication session between a plurality of communication devices that includes a first communication device and a second communication device;
sending, to the first communication device, a test audio signal to be output by the first communication device;
receiving one or more audio signals output by the second communication device;
detecting at least one sound in the one or more audio signals output by the second communication device, wherein the at least one sound is associated with the test audio signal; and
detecting a muting condition between the first communication device and the second communication device based at least in part on detecting the at least one sound associated with the test audio signal,
wherein the muting condition is associated with a susceptibility of audio feedback between the first communication device and the second communication device during the real-time communication session;
determining, based at least on part on detecting the muting condition, that 1) the first communication device will not receive the one or more audio signals output by the second communication device during the real-time communication session, and 2) the second communication device will not receive one or more audio signals output by the first communication device during the real-time communication session;
responsive to detecting the muting condition:
muting the one or more audio signals output by the first communication device, wherein the host device refrains from sending the one or more audio signals to the second communication device; and
muting the one or more audio signals output by the second communication device, wherein the host device refrains from sending the one or more audio signals to the first communication device.

17. The computer-readable storage device of claim 16, wherein the muting condition is based at least in part on a proximity between the first communication device and the second communication device, the operations further comprising:
determining the proximity between the first communication device and the second communication device based at least in part on a first location identifier associated with the first communication device and a second location identifier associated with the second communication device, wherein each of the first location identifier and the second location identifier includes at least one of an Internet Protocol (IP) address, a service set identifier (SSID) of a wireless Internet connection, a media access control (MAC) address, a device name, a caller identification number (caller ID), and one or more geographic coordinates.

18. A host device comprising:
a network interface; and
at least one processor configured to:
establish a real-time communication session between a plurality of communication devices that includes a first communication device and a second communication device;
send, via the network interface and to the first communication device, a test audio signal to be output by the first communication device;
receive, via the network interface, one or more audio signals output by the second communication device;
detect at least one sound in the one or more audio signals output by the second communication device, wherein the at least one sound is associated with the test audio signal; and
detect a muting condition between the first communication device and the second communication device based at least in part on the detected at least one sound associated with the test audio signal,
wherein the muting condition is associated with a susceptibility of audio feedback between the first communication device and the second communication device during the real-time communication session;
determine, based at least in part on the muting condition, that 1) the first communication device will not receive the one or more audio signals output by the second communication device during the real-time communication session, and 2) the second communication device will not receive one or more audio signals output by the first communication device during the real-time communication session;
responsive to detecting the muting condition:
mute the one or more audio signals output by first communication device, wherein the at least one processor refrains from sending the one or more first audio signals to the second communication device; and
mute the one or more audio signals output by the second communication device, wherein the at least one processor refrains from sending the one or more audio signals output by the second communication device to the first communication device.

19. The host device of claim 18,
wherein the at least one processor is further configured to:
  terminate the real-time communication session; and
  establish a subsequent real-time communication session between a second plurality of communication devices that includes the first communication device and the second communication device, and
wherein, based at least in part on the muting condition of the terminated real-time communication session, the at least one processor is configured to:
  mute the one or more audio signals output by the first communication device, wherein the at least one processor refrains from sending the one or more audio signals output by the first communication device to the second communication device; and
  mute the one or more audio signals output by the second communication device, wherein the at least one processor refrains from sending the one or more audio signals output by the second communication device to the first communication device.

* * * * *

UNITED STATES PATENT AND TRADEMARK OFFICE
CERTIFICATE OF CORRECTION

PATENT NO.         : 8,630,208 B1
APPLICATION NO.    : 13/670203
DATED              : January 14, 2014
INVENTOR(S)        : Alexander Kjeldaas It is certified that error appears in the above-identified patent and that said Letters Patent is hereby corrected as shown below:

In The Claims

Column 19, line 33: "of a one or more audio first signals output by the first" should be changed to -- of a one or more audio signals output by the first... --

Signed and Sealed this
Seventh Day of June, 2016

Michelle K. Lee
*Director of the United States Patent and Trademark Office*